Figure 1:
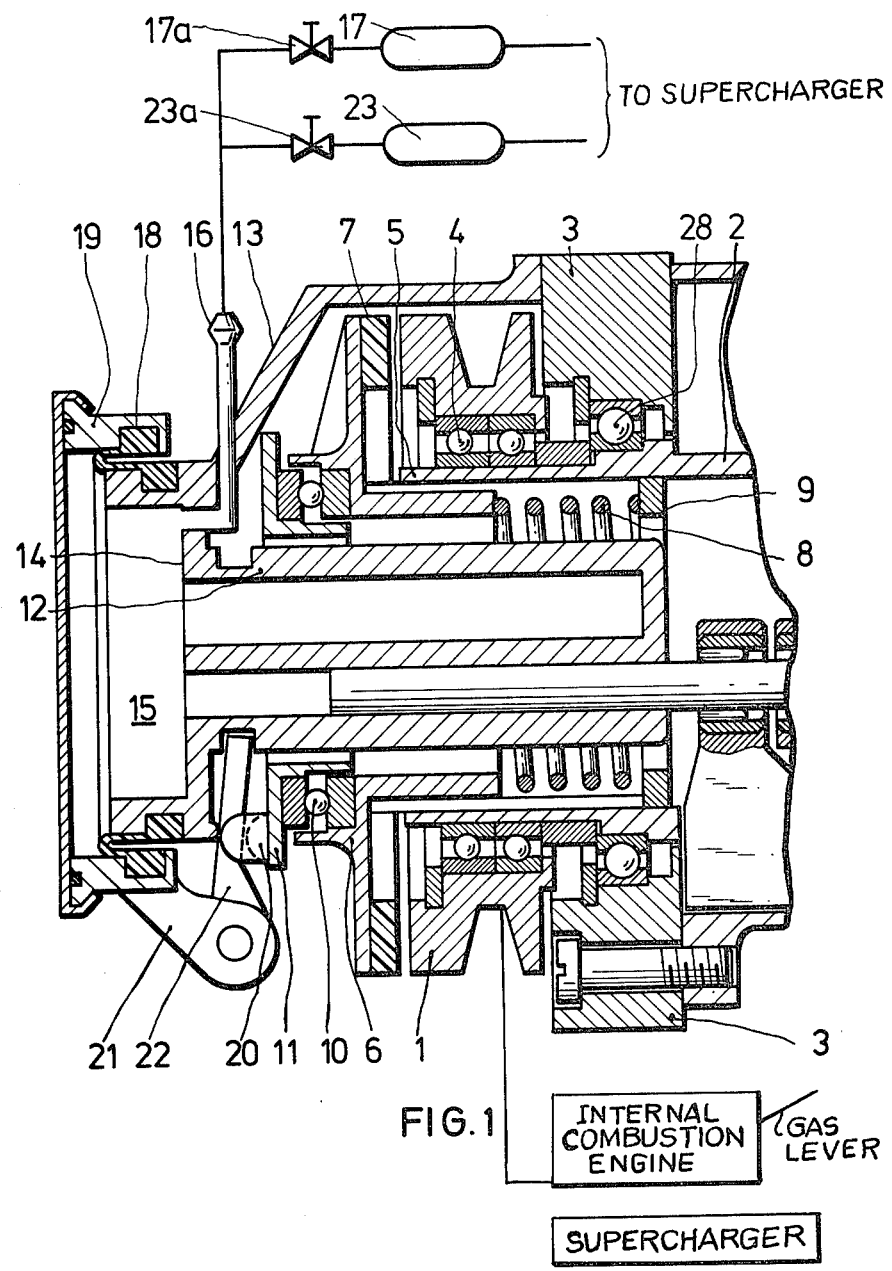

United States Patent [19]

Südbeck et al.

[11] Patent Number: 4,483,428
[45] Date of Patent: Nov. 20, 1984

[54] CLUTCH FOR WORK ARRANGEMENTS, PARTICULARLY ON INTERNAL COMBUSTION MACHINES, AND METHOD FOR ITS OPERATION

[75] Inventors: Rainer Südbeck, Duisburg; Hans Baumgartner, Viersen, both of Fed. Rep. of Germany

[73] Assignee: Pierburg GmbH & Co., KG

[21] Appl. No.: 319,050

[22] Filed: Nov. 6, 1981

[30] Foreign Application Priority Data

Nov. 8, 1980 [DE]  Fed. Rep. of Germany ....... 3042164

[51] Int. Cl.³ .............................................. B60K 41/02
[52] U.S. Cl. .............................. 192/0.07; 192/85 CA; 192/85 V
[58] Field of Search .............. 192/85 C, 85 CA, 85 U, 192/0.07; 123/559, 561; 60/598, 605

[56] References Cited

U.S. PATENT DOCUMENTS

| | | | |
|---|---|---|---|
| 1,645,178 | 10/1927 | Hall-Brown | 192/85 V |
| 2,022,026 | 11/1935 | Bragg | 192/85 C |
| 2,341,587 | 2/1944 | Andres et al. | 192/85 C |
| 3,104,000 | 9/1963 | Erickson | 192/85 |
| 3,314,513 | 4/1967 | Lake et al. | 192/85 CA |
| 4,226,318 | 10/1980 | Morgan | 192/85 CA |

FOREIGN PATENT DOCUMENTS 1551796 11/1968 France .
0302252 12/1954 Switzerland .

Primary Examiner—George H. Krizmanich
Assistant Examiner—M. Manley
Attorney, Agent, or Firm—Toren, McGeady and Stanger

[57] ABSTRACT

In a coupling for a drive device, such as an internal combustion engine, a rotor and an entraining disc are connected. The entraining disc is movable relative to a drive disc so that it can be selectively coupled with the drive disc. A housing at least partly encloses the drive disc and supports a pressure chamber adjacent the entraining disc. The pressure chamber includes a movable cover interconnected with the entraining disc. By regulating the pressure within the chamber, the entraining disc can be coupled or decoupled relative to the drive disc. When coupled to the drive disc, the entraining disc drives the rotor.

15 Claims, 3 Drawing Figures

CLUTCH FOR WORK ARRANGEMENTS, PARTICULARLY ON INTERNAL COMBUSTION MACHINES, AND METHOD FOR ITS OPERATION

This invention relates to a coupling for drive devices, especially on internal combustion engines, and to a method of actuating same.

Working devices, especially on internal combustion engines may, for example, be devices for gas supercharging, for secondary air blowingin, in general for generation of compressed air, for the generation of electricity and the like. Such working devices frequently do not have to be in operation during the entire time in which the machine normally driving them operates. Working devices of this type are, therefore, usually not identical with a main drive machine, especially their principal energy consumer, but they are usually auxiliary units with a working output up to, for example, 10 KW. Such working devices can sometimes, of course, also be equipped for much higher, or indeed much lower working outputs.

For the aforementioned coupling purposes, magnetically or mechanically acutated couplings are widely known. Such couplings however, amongst other disadvantages, possess the following:

They usually have a relatively large volume and large weight, are expensive to manufacture and must be re-adjusted at intervals since the coupling linings wear; in this connection therefore, special maintanence of the coupling is required.

The task underlying the present invention is to create a coupling of the initially mentioned type, which does not possess the aforementioned disadvantages, but indeed exhibits the smallest possible overall volume and low weight, which is simple and inexpensive to manufacture, which does not need to be re-adjusted since it automatically compensates the wear of the lining, and which thereby operates very exactly, and especially avoids "grinding"; such a coupling should be capable of responding rapidly to a very wide variety of signals, and in particular the control of the coupling on the one hand and the pure coupling actuation on the other hand shall be possible with the minimum possible energy consumption.

This task is achieved by the invention by
(a) an entraining disc, journalled coaxially with a drive disc and axially displaceable and in active connection with a rotor, (the entraining disc) comprising a thrust bearing and a thrust bearing cover,
(b) a movable cover, in active connection with the thrust bearing cover, of a chamber loaded with pneumatic pressure and having a non-movable base region, and also
(c) at least one spring in active connection with the entraining disc.

Such a construction is especially light and functionally reliable and avoids the grinding of the coupling when the working device to be driven is decoupled.

The axial displacement capability of the entraining disc in relation to the rotor is advantageously assured in that pins, which are fixed to the entraining disc and assure the necessary clearance in the axial direction, can engage into bores of the rotor in the axial direction; conversely, however, the entraining disc may be equipped with the aforementioned bores and the rotor with the aforementioned pins.

A very simple and easily manufactured active connection between the thrust bearing cover and the movable cover of the chamber loaded with pneumatic pressure is assured in that a suitable mounting is disposed both on the thrust bearing cover and also on the cover of the chamber loaded with pressure and that between these two mountings a lever assures force transmission between these two.

According to a further embodiment of the invention, however, the cover of the chamber loaded with pressure may be firmly fixed to the thrust bearing cover.

A very lower overall height of the coupling is achieved if the pressure connection pipe for the pneumatic actuation is situated in a depression of the cover of the chamber loaded with pressure.

As connection between the cover and the base region of the chamber loaded with pressure, a flat membrane is especially suitable, since this is particularly appropriate for resisting alternating pressure loadings and it also can further reduce the overall size of the chamber. Other membranes, for example rolling membranes, are of course also in principle suitable for the purpose of the present invention.

The functioning of the pneumatically actuated coupling is particularly favourably influenced if the spring acts upon the entraining disc in opposition to the pneumatic pressure.

An additional cup spring, acting between the cover of the chamber subjected to pressure and its base region, enables a reliable coupling and decoupling to be achieved even at relatively low pneumatic pressure. This is particularly so if such a cup spring is constructed as a spring washer, which assures reliable holding in the two limiting positions of the coupling.

A coupling according to this invention is best controlled by gate valves on the upstream side, which may be of comparatively small size and require relatively little energy for their actuation, since they regulate only the gas supply to the pneumatic device which carries out the real work, namely the pneumatic component of the coupling. This is therefore a servo system.

The actual servo-energy is most favourably produced by at least one gas pressure vessel being connected in front of the coupling. Such gas pressure vessels can be continually maintained at the necessary working pressure by means of above-atmospheric or sub-atmospheric sources.

Especially favourable has been found to be a gas connecting line between such a gas pressure vessel and the gas inlet connection of a supercharged internal combustion engine driving the woring device, since in this manner the gas pressure vessel is subjected to the charging pressure present during charging of the internal combustion engine.

According to a further embodiment of the invention, it is also possible to provide a second gas pressure vessel, which is loaded with opposite pressure to that of the first gas pressure vessel and which is connected in front of the pneumatically actuated coupling. In this manner an especially reliable functioning of the coupling can be achieved; the spring which promotes decoupling only needs to apply relatively low forces and can therefore be of very light construction.

One especially compact and light form of embodiment is obtained if the coupling of this invention is integrated together with a gas motor to form a supercharging unit.

A preferred method of actuating the coupling of this invention consists in the chamber of the coupling subjected to pneumatic pressure being loaded with the peak pressure generated during supercharging of an internal combustion engine. Such a servo system requires only minimal expenditure of force to actuate the coupling; furthermore, the supercharging pressure is available in especially energy-favourable form.

The coupling and decoupling of the working device, driven especially by an internal combustion engine, can basically be initiated or effected by a very wide variety of signals. If the working devices are superchargers or devices for blowing-in secondary air into the exhaust gas system of the internal combustion engine, it is especially recommended to carry out coupling and decoupling by means of the gas lever which controls the output of the internal combustion engine, in that the relevant operation is effected at a specific position of the gas lever. This can be achieved, for example, with a known kickdown circuit.

The method of functioning of a coupling of this invention is simple and especially reliable. The spring in active connection with the entraining disc preferably promotes the decoupling; in this way this operation is carried out particularly exactly and undesired grinding of the coupling is avoided.

Such a spring acts most effectively in opposition to the gas pressure which actuates the coupling. The force produced by the pneumatic pressure therefore must overcome the counter-force of the spring for coupling up to be carried out. On the other hand, such a spring promotes decoupling also, to the extent that this does not have to be carried out solely by the pneumatic device and the latter therefore can be of especially light and simple form. It may indeed even be sufficient to allow the pneumatic pressure applied for coupling simply to escape in order to effect decoupling.

With a further spring, acting inside the chamber subjected to pressure, coupling or decoupling and the maintaining of the coupling in the end positions is furthermore facilitated.

Couplings according to this invention therefore have overall the advantage of relatively small over volume, low weight and also comparatively low manufacturing costs. An outstanding advantage lies in the fact that re-adjustment of the coupling normally required at intervals (due to wear of the lining) can be omitted, since such pneumatic couplings automatically adapt to the wear of the lining by increasing the stroke. The simple and particularly light form of couplings according to this invention is, especially when combined with a gas motor and a gas pump drive device, advantageous both for the efficiency of the gas motor as drive for the gas pump and also for the efficiency of the entire unit as a supercharger.

Figure 2:
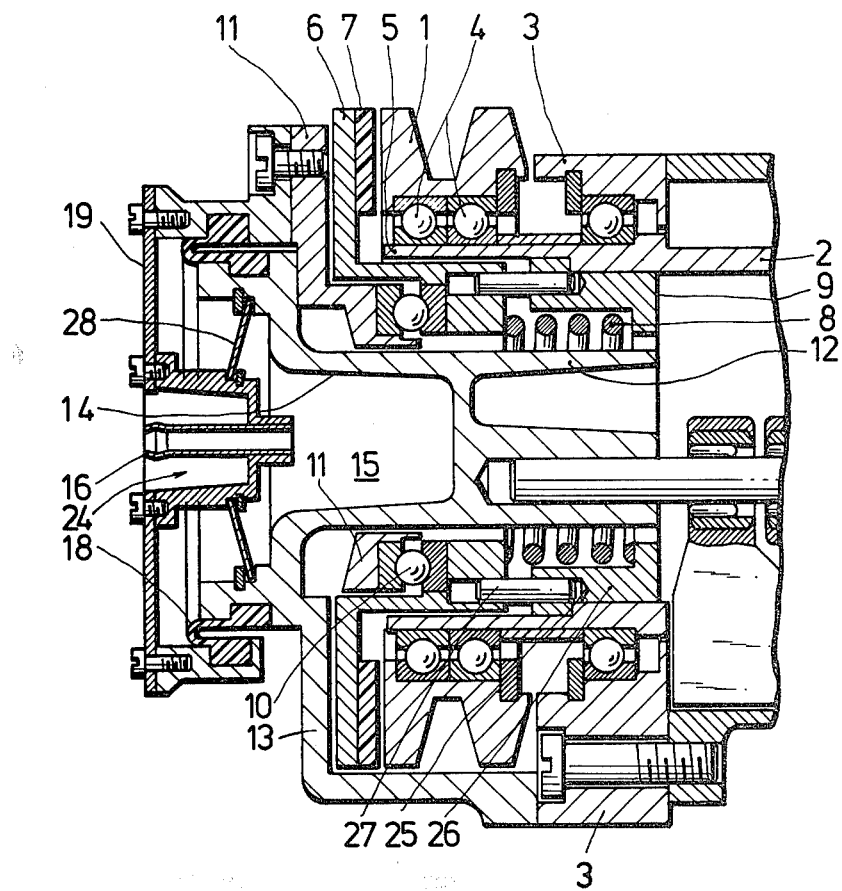
Figure 3:
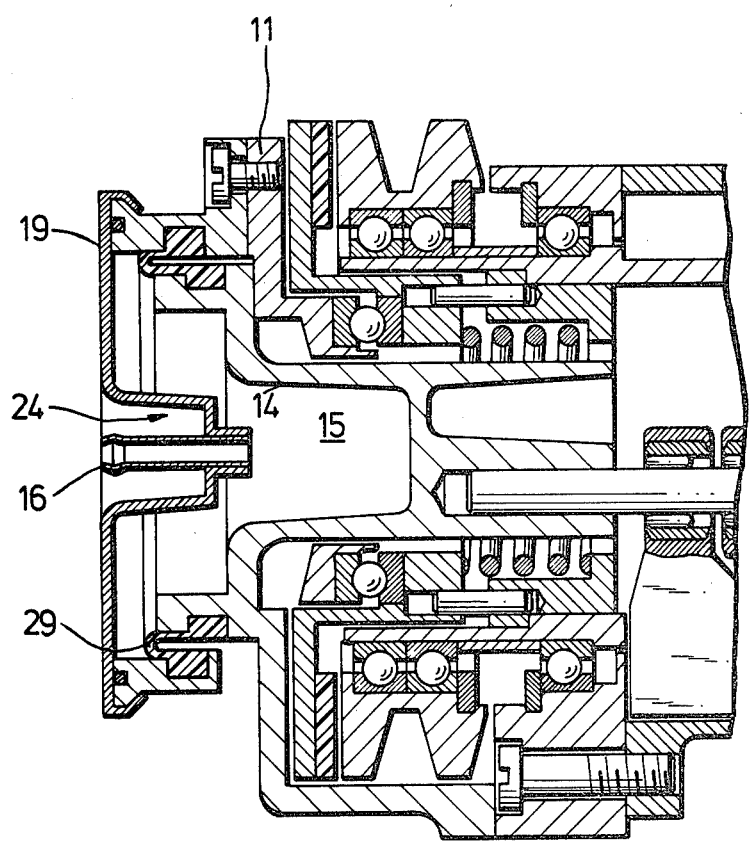

The invention is explained in more detail with reference to examples of embodiment thereof illustrated in the drawings. The drawings show:

FIG. 1 a longitudinal section through a coupling according to this invention indicating diagrammatically the working devices;

FIG. 2 a coupling according to FIG. 1 in another embodiment and without the working devices;

FIG. 3 an embodiment of the coupling modified from FIGS. 1 and 2.

In the example according to FIG. 1, a drive disc 1 revolves continuously at a rotational speed determined by a drive unit, or internal combustion engine. The rotational speed is, for example for the case where the working device to be coupled is a supercharger, so designed that when the supercharger is coupled up the desired supercharging pressure of, for example, 1.4 bar is assured. In the coupled state, a rotor 2 of a working device, not further illustrated here, is to be driven by the drive disc 1. The rotor 2 is mounted with low friction relative to the housing 3 of the working device. The drive disc 1—in the present case a V-belt disc—which is connected via a drive not illustrated here for instance to an internal combustion engine, is journalled free to rotate and with low friction via a ball bearing 4 on an extension 5 of the rotor 2.

An entraining disc 6 is disposed coaxially to the drive disc 1 and axially displaceable relative to the extension 5 of the rotor 2 in such a manner that it can come into engagement with its lining 7 with the drive disc 1 or be disengaged therefrom. Coaxial to the rotor 2 a spring 8 bears on the one hand against a shoulder 9 of the rotor 2 and on the other hand against the entraining disc 6 in such a manner that, when an appropriate counter-force is lacking, it keeps the entraining disc 6 away from the drive disc 1. On the opposite side in the axial direction from that on which the spring 8 acts upon the entraining disc 6, the latter possesses a thrust bearing 10 having a thrust bearing cover 11. The thrust bearing cover 11 is axially displaceable in a coaxial region 12 of the housing 3 in the axial direction together with the thrust bearing 10 and the entraining disc 6.

The housing 3 possesses an end region 13, which covers the upper part of the drive disc 1 and leaves the lower part of the drive disc 1 exposed for the engagement of a V-belt. This end region 13 carries the housing region 12 and constitutes, at its left-hand end, a base region 14 of a chamber 15, which is connected via a pressure connection pipe 16 with a gas pressure vessel 17. The chamber 15 is formed on the one hand by the base region 14 and on the other hand by a cover 19, sealingly connected with the base region 14 by a rolling membrane 18.

The thrust bearing cover 11 and the cover 19 of the chamber 15 each possess a mounting 20, 21 respectively, which are in active connection with each other by a lever 22 in such a manner that, when a relative movement of the thrust bearing cover 11 and the housing region 12 occurs, the cover 19 is moved in the same direction as the thrust bearing cover 11. Coversely, the thrust bearing cover 11 is moved via the lever 22 by an axial movement of the cover 19 in the same direction.

Sub-atmospheric pressure of adequate magnitude at the pressure connection pipe 16—achieved by producing a pipe connection with the pressure vessel 17 via valves 17a—would move the cover 19 towards the base region 14 and displace the thrust bearing cover 11, via the mountings 20 and 21 and the lever 22, towards the right by overcoming the spring force of the spring 8. As a consequence, the lining 7 of the entraining disc 6 can come into active connection with the drive disc 1. Since the entraining disc 6 and the rotor 2 are connected together in force-transmitting manner in the rotational direction, for example by a set of wedge teeth, the rotor 2 is now no longer free to rotate, but is driven by the drive disc 1 at that rotational speed at which the latter in turn is driven, for example by an internal combustion engine. This rotational speed is sufficiently high, when coupled to a supercharger, for a desired charging pressure of, for example 1.4 bar to be reached.

When decoupling the working device from the drive disc 1, the vacuum in the chamber 15 is reduced, so that the spring 8 is capable of again retracting the entraining disc 6 from the drive disc 1. This procedure can also be promoted by the chamber 15 being brought to a certain above-atmospheric pressure via the pressure connection pipe 16 and a valve 23a, by a gas connection to a further gas pressure vessel 23 being opened. The gas pressure vessels 17 (for vacuum) and 23 (for above-atmospheric pressure) are connected to pressure generators, such as a supercharger.

The example of embodiment according to FIG. 2 differs from that of FIG. 1 in that here some further improvements have been carried out, which favourably influence the overall weight, the overall dimensions and manufacture. The pressure connection pipe 16 is now housed in a depression 24 of the cover 19. Between the thrust bearing cover 11 and cover 19 a bolted connection has been created, so that the mountings 20 and 21 and lever 22 are omitted. The active connection between entraining disc 6 and rotor 2 is produced by axially oriented bores 25 being disposed in a sleeve 26 pressed into the rotor 2, in which bores pins 27 of the entraining disc 6 are axially slidable. These pins assure the force transmission in the rotational direction. They can, however, also be mounted correspondingly on the rotor 2 and engage in corresponding bores of the entraining disc 6. Furthermore, a cup spring 28 has also been provided, which is disposed between the base region 14 and the cover 19 in such a manner that it promotes the decoupling and coupling-up operations. If the cup spring is constructed as a spring washer, it may also serve for reliably holding the coupling in the two extreme positions.

A further variant of the coupling, corresponding to FIG. 2, can be seen from FIG. 3, according to which the rolling membrane 18 has been replaced by a flat membrane 29. Such flat membranes are still more suitable than rolling membranes for withstanding the repeated pressure fluctuating loads such as occur in the present case.

It is also possible so to arrange the entraining disc 6 in relation to the drive disc 1 that the cover 19, when an above-atmospheric pressure is applied in the chamber 15 via pressure connection pipe 16, causes by its movement coupling-up instead of decoupling and accordingly decoupling is effected by releasing the pressure or applying a vacuum. For this purpose, in the embodiments according to FIGS. 1 to 3, the entraining disc 6 would then have to be disposed on the opposite side of the drive disc 1 and the spring 8 and the force transmission by the thrust bearing 10 modified accordingly.

We claim:

1. Coupling for a drive device, such as an internal combustion engine, comprising a drive disc (1) having an axis of rotation, an outer circumferential surface extending around the axis, and a first end surface and a second end surface extending transversely of the drive disc axis, a rotor (2) coaxially mounted relative to said drive disc, an entraining disc (6) coaxial relative to said drive disc, said entraining disc is axially movable relative to and is connected with said rotor said entraining disc includes a first end surface and a second end surface exrtending transversely of the drive disc axis, a thrust bearing (10) mounted on said entraining disc, a thrust bearing cover (11) attached to said thrust bearing, shifting means connected to said thrust bearing cover, means forming a pressure chamber (15) including a stationary base (14), a spring (8) applying an axial biasing force against said entraining disc, and means for introducing fluid pressure into said pressure chamber, wherein the improvement comprises a housing (3) having a circumferential part relative to said drive disc axis laterally enclosing at least a part of said drive disc and an end part covering at least a part of said end surfaces of said drive disc, said drive disc is in an annular disc, said rotor extends through said drive disc from the first end surface toward the second end surface, the first end surface of said entraining disc faces the second end surface of said drive disc, said pressure chamber means is spaced axially from the second end surface of said entraining disc and more remote from the first end surface thereof and comprises a cover extending transversely of the axis of said drive disc and movably mounted on said end part of said housing and spaced from said stationary base so that said pressure chamber is located between said cover and said base and said base is spaced axially from the second end surface of said entraining disc, said shifting means is connected to said cover for transmitting the movement of said cover via said thrust bearing cover and said thrust ring to said entraining disc for selectively coupling and uncoupling said entraining disc and drive disc.

2. Coupling according to claim 1, characterized by pins (27) on the entraining disc (6) or on the rotor, engaging in axial direction into bores (25) of the rotor (2) or of the entraining disc(6).

3. Coupling according to claim 1, wherein said shifting means comprises a lever (22), acting between a mounting (20) on the thrust bearing cover (11) and a mounting (21) on the cover (19).

4. Coupling according to claim 1, characterized in that the cover (19) is firmly connected to the thrust bearing cover (11).

5. Coupling according to claim 1, characterized by a pressure connection pipe (16) in a depression on the cover (19).

6. Coupling according to claim 1, characterized in that the cover (19) closes the chamber (15) with the insertion therebetween of a flat membrane (29) between the cover (19) and the base (14).

7. Coupling according to claim 1, characterized in that the spring (8) acts in opposition to the fluid pressure in the pressure chamber (15) acting on the entraining disc (6).

8. Coupling according to claim 1, characterized by a cup spring (28) acting between the cover (19) and the base (14).

9. Coupling according to claim 8, characterized in that the cup spring (28) is a spring washer.

10. Coupling according to claim 1, wherein said means for introducing fluid pressure comprises gate valves (17a, 23a) connected in front of the space (15).

11. Coupling according to claim 1 or 10, wherein said means for introducing fluid pressure comprises at least one gas pressure vessel (17) connected to the chamber (15).

12. Coupling according to claim 11, characterized by a further gas pressure vessel (23), connected to the chamber (15), and having pressure opposed to the gas pressure vessel (17).

13. Coupling according to claim 1, characterized by a gas motor connected to the coupling and forming one supercharging unit.

14. Method of actuating a coupling according to claim 1, including loading the chamber (15) of the coupling with the peak pressure generated at supercharging of an internal combustion engine.

15. Method according to claim 14, including the step of effecting the coupling and decoupling of the rotor (2) and the drive disc (1) at a specific position of a gas lever which controls the output of the internal combustion engine.

* * * * *